United States Patent [19]
Castoe

[11] 3,807,693
[45] Apr. 30, 1974

[54] PUSH-PULL TOOL
[75] Inventor: John Herman Castoe, Sunland, Calif.
[73] Assignee: Branick Manufacturing Company, Fargo, S. Dak.
[22] Filed: Apr. 14, 1972
[21] Appl. No.: 243,999

[52] U.S. Cl. .................................................. 254/1
[51] Int. Cl............................................. B66f 1/00
[58] Field of Search ........ 254/120, 131, 131.5, 129, 254/11–17, 1; 29/267

[56] References Cited
UNITED STATES PATENTS

| 164,145 | 6/1875 | Clark | 254/16 |
| 77,610 | 5/1868 | Hall | 254/17 |
| 523,647 | 7/1894 | Stewart | 254/16 |
| 3,537,685 | 11/1970 | Gregory | 254/131 |

Primary Examiner—Othell M. Simpson
Attorney, Agent, or Firm—Roy E. Petherbridge; Robert L. Lindgren; Edward D. Gilhooly

[57] ABSTRACT

The present invention relates to an improved push-pull tool having particular, although not exclusive, application in connection with the setting of camber and caster parameters of an automotive suspension system. The type of suspension system to which the present invention is especially well suited is that exemplified by Ford and Mercury automobile suspensions. Such a system is equipped with an upper control arm which is secured to a frame side rail by means of an inner shaft, about which the upper arm is able to experience limited rotation about a horizontal axis, the inner shaft being mounted to a mounting plate secured to the side frame rail. The mounting plate is slotted to permit limited adjustment of the inner shaft transverse to the axis of the vehicle itself. Typically, the inner shaft is secured to the mounting plate by a pair of bolts disposed immediately inwardly of the bushing assembly disposed at either end of the inner shaft about which the upper control arm is swingably mounted. Access to the inner shaft and the bolts securing it to the mounting plate is through an opening in the upper control arm.

6 Claims, 6 Drawing Figures

PATENTED APR 30 1974

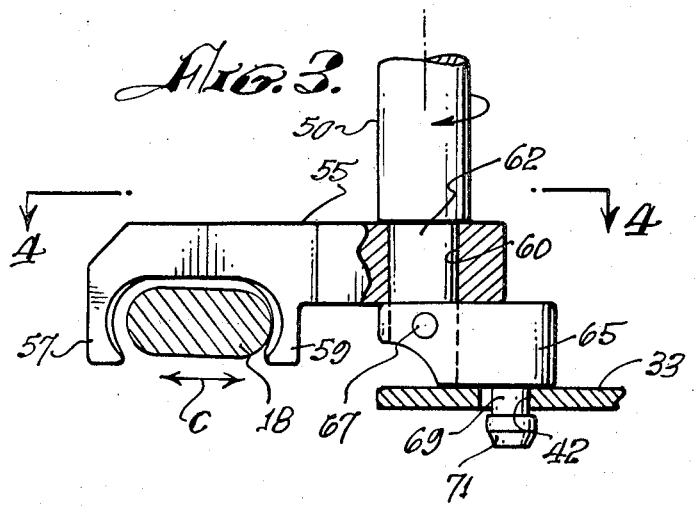
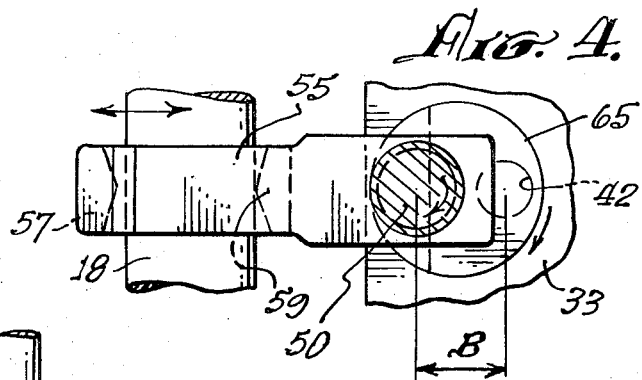
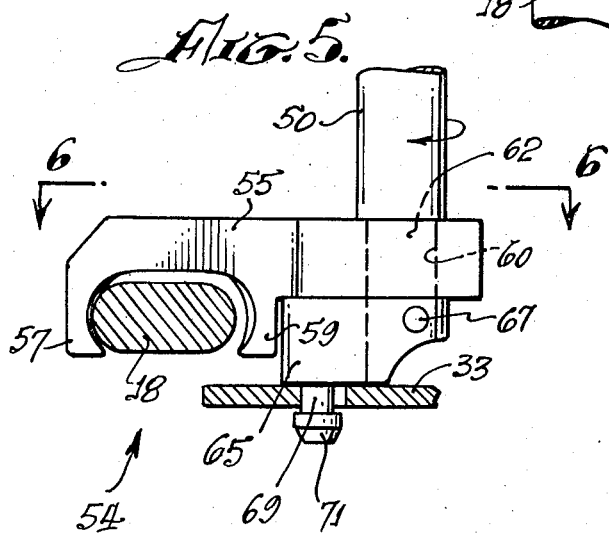
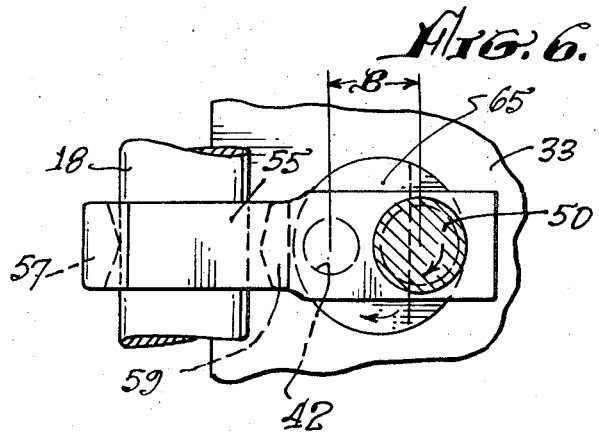

PUSH-PULL TOOL

The present invention comprises an improved push-pull tool capable of passing through the opening in the upper control arm and grasping the inner shaft by means of a claw. The claw is mounted to a vertical shaft by means of an eccentric caming device in such a manner that rotation of the shaft causes translation of the claw either towards or away from the shaft thereby effecting either a push or pull motion on the object grasped in the claw.

BACKGROUND OF THE INVENTION

The improved push-pull tool which comprises the present invention was conceived and developed for the particular purpose of permitting adjustment of the camber and caster on a suspension system of the type which has been found on Ford and Mercury automobiles for the past many years. These parameters are controlled by the position of an inner shaft upon which the upper control arm of the suspension system is mounted, relative to the frame side rail of the vehicle. Camber is controlled by setting the shaft in a pre-set position transverse to the axis of the automobile, and a caster setting is accomplished by adjustment of either the forward or aft end of the inner shaft a greater or lesser distance from the center line of the car. Both adjustments are accomplished by loosening the two bolts which hold the inner shaft to the mounting plate and moving each end of the inner shaft to the desired position.

The foregoing operation, while simplistic in verbalization, is rendered extremely difficult in practice by virtue of the location of the inner shaft beneath the upper control arm which limits access and makes the use of more ordinary tools difficult, if not impossible. The design of the suspension elements, and their location is another example of the automotive designer locating components without ever having had the experience of being required to work on the components he has designed. In any event, the Ford Motor Company has offered a tool which it designates T65P-3000-A, which tool resembles a crowbar with a hook, for effecting the adjustment of the inner shaft. Such a tool, and its use, is illustrated along with an exploded view of the front suspension of the 1966–72 Ford and Mercury in Motor's Auto Repair Manual, 1972 Service Trade Edition, copyright 1971, page 2–342, FIGS. 1 and 2 respectively. The tool comprises nothing more than a bar which is secured in one of the tool indexing holes provided in the mounting plate for leverage, with a hook which extends over the inner shaft so that when the bolts on either side of the shaft are loosened, the upper end of the bar may be pulled towards the user thus pulling the inner shaft towards the user to adjust the camber and caster. The travel of the bar is, of course, limited by the size of the access opening in the upper control arm and the amount of plumbing located over and about the area.

Regrettably, however, the special tool T65P-3000-A, while being able to pull the inner shaft outwardly or away from the center line of the vehicle, it is incapable of moving the shaft inwardly towards the center line of the vehicle. Thus, if the adjustment required is not the one the tool is capable of performing, the tool is useless and the mechanic must find other means to move the inner shaft. Typically he will attempt to pound the inner shaft inwardly and then use the special tool to pull it back into the proper position. Quite obviously, fine adjustment is difficult in light of all of the corrosion, grease and dirt which commonly accumulates between the upper control arm and mounting plate and accordingly, the adjustment of the inner shaft requires considerable force as well as control.

In order to obviate the drawbacks of the special tool illustrated in MOTORS, a tool has been devised which would permit adjustment of the inner shaft in either direction, and that tool is the subject of my previously issued United States Letters Patent No. 3,285,622, which issued November 15, 1966. That tool requires that the user have access to an area immediately inboard of the terminus of the upper control arm in order that he might get a wrench on clamp bolts used to effect the kind of movement desired of the inner control arm. However, well intentioned automotive designers have clogged access to this area with a plethora of heater hoses, air conditioning compressors, emission controls and air pumps and the like such that access to the area of the inner shaft is, on the later model vehicles, relegated to the small opening in the upper control arm.

It is to the problems above numerated that the improved push-pull tool comprising the present invention is directed.

SUMMARY OF THE INVENTION

The invention as herein set forth may be summarized as comprising a push-pull tool having an elongated shaft capable of extending upward through an available opening in the upper control arm and plumbing disposed above the suspension assembly, the shaft having its lower portion anchored in the mounting plate and being provided with gripping means extending outwardly from the shaft to engage the inner shaft and camming means inter-connecting the shaft and gripping means whereby rotation of the shaft results in reciprocation of the gripping means.

Accordingly, it is an object of the invention to provide an improved push-pull tool having particular, although not exclusive, use in connection with the adjustment of camber and caster in a suspension system of the type described wherein both fore and aft movement of the inner shaft is accomplished by rotational movement of the tool from a convenient operating position above the upper control arm.

It is another object of the invention to provide an improved push-pull tool wherein a high degree of mechanical advantage is achieved to permit fine adjustment of the position of the inner shaft from a remote position relative thereto. It is another and still further objective of the invention to provide an improved tool of the type described wherein a substantial amount of force may be applied in carefully controlled increments in both a fore and aft direction with equal ease and with the same tool to thereby permit fine adjustment of both ends of the inner shaft in either direction transverse to its axis.

These and other objects and advantages of the present invention will become apparent from the following detailed description of the preferred embodiment, taken in conjunction with the appended drawings wherein:

DESCRIPTION OF THE FIGURES

FIG. 3 is an enlarged, partially sectioned elevation of the tool in its "push" mode, showing the relative position of the inner shaft and mounting plate;

FIG. 4 is a sectional view of FIG. 3 taken along lines 4—4 thereof;

FIG. 5 is a view similar to FIG. 3, but showing the position of the tool at its limits in the "pull" mode; and FIG. 6 is a sectional view taken along lines 6—6 of FIG. 5.

DESCRIPTION OF A PREFERRED EMBODIMENT AS ILLUSTRATED

Figures 1, 2:
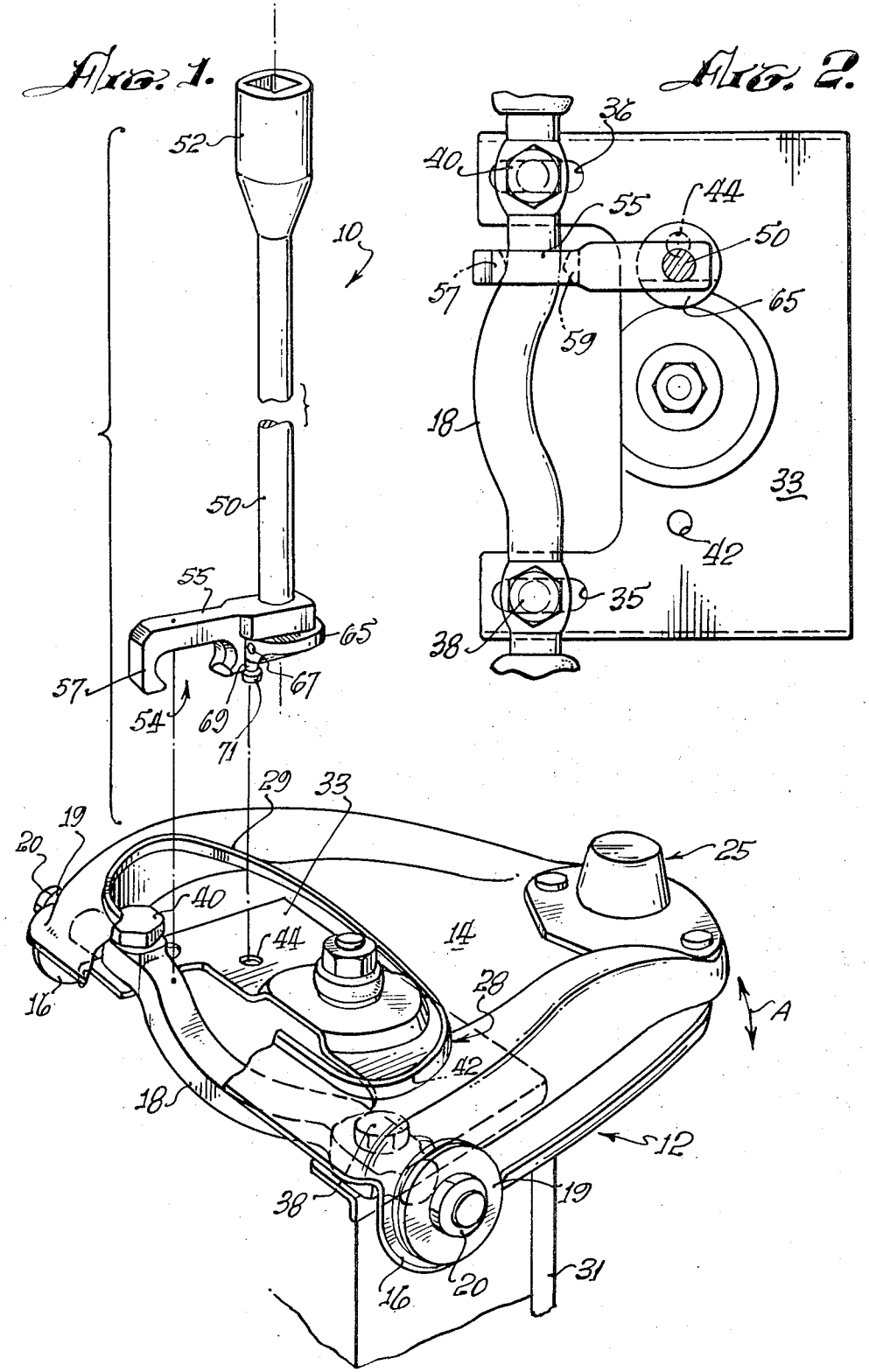
FIG. 1 is an exploded, partially sectioned, pictorial view of the upper control arm assembly and a tool constructed in accordance with the present invention, illustrating their relative positions immediately prior to placing the tool in operation, and illustrating the position which the tool assumes in use.
FIG. 2 is a partially sectioned plan view of a portion of the mounting plate and inner shaft structure, illustrating the tool of the present invention in its operative position, and being enlarged to show the operative elements of the invention in greater detail.

As will become evident from the following detailed description, the invention is susceptible of various modification and alternative constructions without departure from the underlying principle thereof. For the purposes of this disclosure, however, a particular illustrative embodiment is set out in the drawings and will be described in detail. It will be understood that the invention is not intended to be strictly limited to the particular disclosed form, but rather to cover all modifications, alternative constructions, and equivalent falling within the sphere and scope of the invention as claimed.

With reference now to the drawings, and in particular to FIG. 1 thereof, a tool constructed in accordance with the present invention is there illustrated in conjunction with a portion of a suspension system for which the tool has particular application. There has been no effort to illustrate the entire suspension system in that the applicability of the tool is limited to that portion of the system which is shown. It will be appreciated, however, that the illustrated portion operates in conjunction with an entire system of the type generally illustrated in FIG. 1 of page 2–342 of Motor's Auto Repair Manual, 1972 edition. With the foregoing in mind, an improved push-pull tool constructed in accordance with the present invention is illustrated generally at 10, disposed above, and aligned for use in connection with, an upper control arm assembly indicated generally at 12.

Since the operation of the tool 10 will be best illustrated if the control arm assembly 12 is first understood, there is shown in FIG. 1, as comprising the assembly 12, and upper control arm 14 consisting of, in the usual case, a stamped generally triangular metallic member. The control arm 14 is provided with spaced parallel bosses 16 at the extremities of its base formed appertures therein for receipt of the opposite ends of the inner shaft 18. Bushing assemblies 19 are mounted on the respective ends of the shaft 18 which pass through the bosses 16 and nuts 20 secure the control arm and bushing assemblies to the inner shaft and thereby permit limited swing or rotation of the upper control arm about the ends of the inner shaft 18 generally in the direction of the arrows A illustrated in that figure. The apex of the control arm contains a ball joint assembly, the housing for which is indicated generally at 25. The ball joint is connected to a spindle for support of the wheel assembly. The spindle, lower control arm and related hardware, though necessary to the vehicle, is not illustrated since it does not materially aid in the understanding of the invention.

Inboard of the ball joint assembly 25 is an access opening 28 defined by ridge 29, which opening conveniently assumes the general configuration of the upper control arm and is adapted to provide access to the area immediately beneath the control arm to permit, inter alia, securing and release of shock absorbers and springs which attach there beneath, and for access to the inner shaft to permit adjustment of caster and camber.

The upper control arm assembly 12 is secured to the frame side rail 31 of the automobile by means of a mounting plate 33 which may be best seen in FIG. 2. The mounting plate may be welded or secured in any other suitable means to the side frame rail, but is rigid with respect thereto. The mounting plate is provided with spaced parallel slotted apperture 35 and 36 as seen in FIG. 2 and the inner shaft 18 bolts to the mounting plate by means of bolts 38 and 40 respectively passing through and secured beneath said appertures at the forward and aft position.

The mounting bolts are disposed immediately inwardly of the bushing assemblies which connect with the upper control arm itself as thus seen in FIG. 2, the slots 35 and 36 extend transversely of the axis of the inner shaft 18 and thu provide limited adjustment of the position of the inner shaft transverse to the vehicle axis. Accordingly, the position of the upper control arm is settable relative to the mounting plate and thus to the side frame rail 31 of the vehicle.

The mounting plate is also provided with a pair of openings or tool index holes 42 and 44. These holes were formed specifically to accommodate the special adjustment tool T65P-3000-A previously referred to and accordingly, are disposed in spaced relation with respect to the inner shaft and slightly inboard of the appertures 35 and 36 to thereby provide positioning for the tool referred to which will permit the user to effect optimum leverage on the inner shaft at the points at which it is mounted to the mounting plate by means of bolts 38 and 40 respectively.

As indicated, access to the inner shaft has, by virtue of the vagaries of engine compartment design, been limited to the access opening 28 provided in the upper control arm. Accordingly, and in keeping with one aspect of the present invention, an improved push-pull tool 10 is provided which is capable of being inserted through a minimum opening in the engine compartment aligned with the access opening 28 and fully operated from a convenient and comfortable position above the upper control arm where the user can effect the desired adjustment in any direction, and without visual observation of the operation of the tool itself. Still referring to FIG. 1, the improved push-pull tool 10 comprises an elongated shaft 50 having a socket 52 disposed at one end thereof, and a claw assembly illustrated generally at 54 extending outwardly from the other.

Referring to FIGS. 1 and 3, the claw assembly comprises, generally, a plate 55 having spaced, generally parallel depending fingers 57 and 59 respectively together defining a claw for a receipt and grasping of a portion of the inner shaft 18. The plate 55 is appertured at 60 and is suitably mounted for relative rotation about a reduced portion 62 of the shaft 50. Known bushing materials may be provided in order that lubrication problems resulting from continued use in the area of the apperture and shaft 60 and 62 respectively may be obviated. It will be appreciated that in the illustrated case the jaws of the claw are fixed, settable depending fingers may be employed in a known manner to provide an adjustable claw.

In keeping with further aspects of the invention, the improved tool is constructed to effect push-pull translation of the claw assembly 54 upon rotation of the shaft 50, and this accomplished by provision of an eccentric 65, best illustrated in FIGS. 3 and 5 which is rigidly fixed to the outer extremity of the reduced portion 62 of the shaft by any convenient means such as pin 67.

The eccentric 65 is provided, in any suitable fashion, with an anchor pin 69 depending therefrom. The anchor pin is of such size and diameter as to conveniently be received in the desired one of the tool index holes 42 and 44 provided in the mounting plate 33. As best seen in FIGS. 3 and 5, the anchor pin is provided with a flanged cap 71 which effectively inhibits the tool from being inadvertently pulled out of the mounting plate 33 while the tool is in operation.

The operation of the tool is clearly illustrated in FIGS. 3 through 6. In those figures, and in particular FIGS. 4 and 6, the operating limits of the tool are illustrated. As seen in FIGS. 3 and 5, the claw assembly 54 fits over a portion of the inner control arm 18 and the anchor pin 69 is firmly mounted in one of the index holes, such as 42. By inserting either a rachet wrench or a breakover bar in the socket 52 in the end of the tool which extends upwardly from the inner control arm assembly 12 to a convenient working position within easy and confortable reach of the user, the shaft 50 may be rotated. Clearly, it is possible to apply as much torque as may be required to the shaft 50 to move the inner shaft simply by increasing the length of the lever arm of the tool connected in the socket 52 to rotate to shaft 50.

Prior to actual rotation of the shaft 50, the bolts 38 and 40 are loosened, as is the case in any adjustment operation on the suspension system described, in order to permit translation of the inner shaft relative to the mounting plate within the limits defined by the slots 35 and 36.

Application of rotational motion to the shaft 50, which is rotatably anchored to the mounting plate by means of pin 69 disposed in one of the index holes the shaft is caused to revolve about the axis of the anchor pin which is offset from that of the shaft. Accordingly, the entire claw assembly is moved laterally in a reciprocating motion. Since the anchor pin 69 is offset from the axis of the shaft 50 by an amount "B" and since the claw assembly is rotatable relative to the shaft 50, revolution of the shaft about the anchor pin has a camming effect on the claw assembly causing it to reciprocate in the direction of the arrow "C" (FIG. 3). Quite clearly, the limits of reciprocation, or stroke, is equal to the distance "2B" which distance may be built into the tool to fit the specific needs to which the tool is to be placed. Since the fingers 57 and 59 of the claw are disposed on either side of the inner control arm 18, rotation of the shaft 50 effects, at the user's choice, either a push or a pull force on the inner shaft thereby permitting both fore and aft adjustment. Moreover, very slight movements of the inner shaft may be affected by the tool of the present invention thereby permitting fine adjustment of camber and caster as desired. FIGS. 3 and 4 illustrate the inter-relationship of the inner shaft and the claw assembly in its push mode, i.e., movement of the inner shaft towards the center line of the vehicle, and FIGS. 5 and 6 illustrate the pull mode away from the center line of the vehicle.

As will be evident from the construction of the assembly shown in FIG. 1, fine adjustment of each side of the inner shaft may be effected by use of the tool in the manner just described thereby permitting fine camber and caster adjustment from a position which is both convenient and comfortable for the user. Moreover, lateral adjustment is effected by rotation of the shaft 50, as distinguished from the oscillatory movement required of existing tools. Thus the tool is usable in the very limited space available on modern vehicles.

It will be appreciated that other suitable means for effecting reciprocation of the claw by rotation of the shaft are contemplated and would not involve a departure from the invention.

What is claimed is:

1. An improved push-pull tool comprising an elongated shaft, means at one end of said shaft for applying rotational force thereto, anchor means at the opposite end thereof for securing said end against transverse movement at a point offset from the axis of rotation of the shaft, means defining a claw extending outwardly from said shaft, and means interconnecting said claw means to said shaft such that rotational movement applied to said shaft in a first direction is translated into movement of said claw means away from said point and rotational movement in a second direction is translated into movement of the claw means toward said point.

2. The tool as set forth in claim 1 wherein said anchor means is radially offset from the axis of said shaft such that rotational forces applied to said shaft will cause said shaft to revolve about the axis of said anchor means, thereby causing reciprocation of said claw means commencing in a selected direction with respect to the shaft dependent on the direction of rotation thereof.

3. The tool as set forth in claim 1 wherein said claw means comprises a plate portion having essentially parallel depending fingers disposed in a preset spaced relation for engagement of a member to be moved by said tool.

4. An improved push-pull tool comprising an elongated shaft, means at one end of said shaft for applying rotational force thereto, anchor means at the opposite end thereof for securing said end against transverse movement, means defining a claw extending outwardly from said shaft, and means interconnecting said claw means to said shaft such that rotational movement applied to said shaft is translated into reciprocation of said claw means, an eccentric is disposed at said opposite end of said shaft, said eccentric having a pin depending therefrom at a predetermined spaced relation with respect to the axis of said shaft, said pin adapted to permit anchoring of said opposite end of said shaft against lateral movement.

5. The tool as set forth in claim 4 wherein said eccentric is fixed to said shaft and rotatable therewith.

6. The tool as set forth in claim 4 wherein said opposite end of said shaft comprises a reduced portion, said claw means being received on said reduced portion and rotatable therein, and said eccentric being mounted on said reduced end portion so as to secure said claw means against axial movement along said shaft.

* * * * *